Jan. 18, 1966     S. JONASSEN     3,229,303
SPORTSMAN'S GOGGLE
Filed July 16, 1963     2 Sheets-Sheet 1
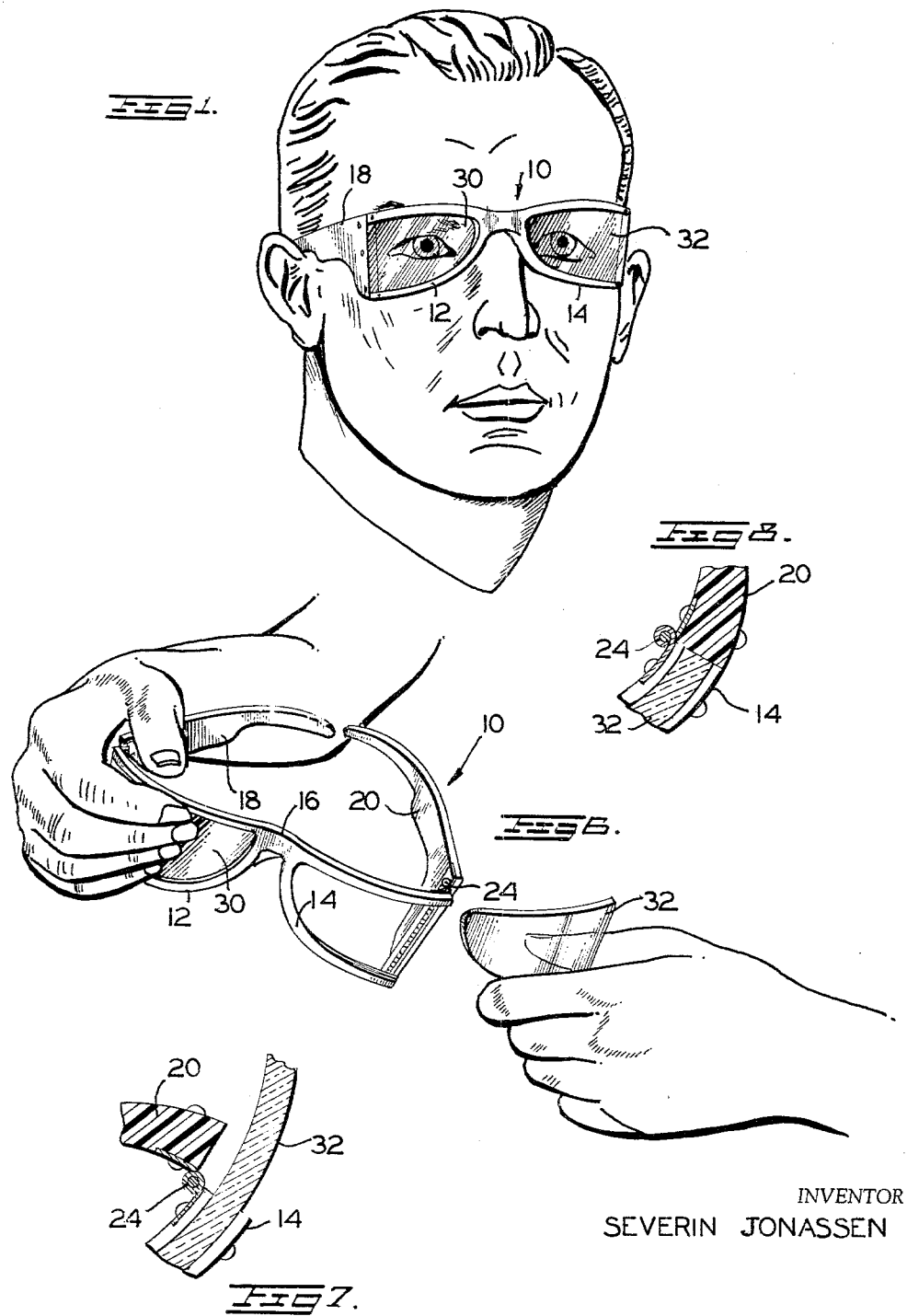
INVENTOR
SEVERIN JONASSEN

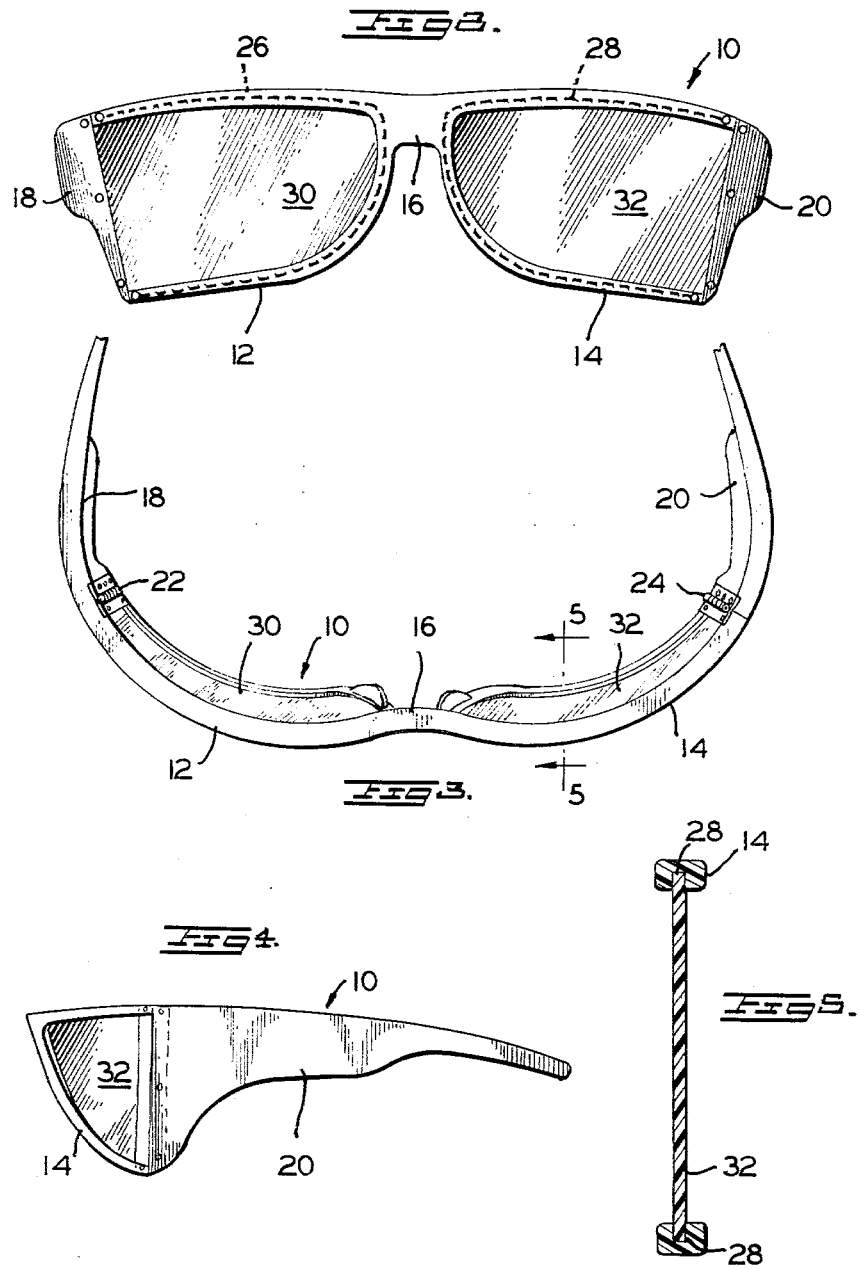

United States Patent Office 3,229,303
Patented Jan. 18, 1966

3,229,303
SPORTSMAN'S GOGGLE
Severin Jonassen, Lafayette Hill, Pa., assignor, by mesne assignments, to Renauld International, Inc., Reading, Pa., a corporation of Pennsylvania
Filed July 16, 1963, Ser. No. 295,445
3 Claims. (Cl. 2—14)

The present invention relates to improvements in eyewear and is concerned more particularly with devices of the sunglass type but which are adapted to various conditions which may be encountered in use by sportsmen, for example.

An object of the invention is to provide sunglasses adapted for use with readily interchangeable lenses which may be of varying color or density to be selected by the user as appropriate for prevailing conditions.

Another object of the invention is to provide an eye-frame construction wherein lenses may be readily locked in operative position and just as readily unlocked for removal and replacement.

Other objects and advantages will be apparent from the following detailed description taken in conjunction with the accompanying drawings wherein a preferred embodiment of the principles of the invention has been selected for exemplification.

In the drawings:
FIG. 1 shows a goggle constructed in accordance with the invention operatively positioned upon a user;
FIG. 2 is a front elevational view of the goggle shown in FIG. 1;
FIG. 3 is a top plan view;
FIG. 4 is a side elevational view;
FIG. 5 is a vertical sectional view taken on the line 5—5 of FIG. 3;
FIG. 6 is a perspective view illustrating the manner of inserting a lens in a lens frame of the goggle;
FIG. 7 is an enlarged fragmentary horizontal sectional view of an end portion of the lens frame with the temple shown in the position as in FIG. 6 and the manner in which the lens is seated as the lens frame and lens are brought together; and
FIG. 8 is a view similar to FIG. 7 but showing the lens in seated and locked position.

Referring more particularly to the drawings, wherein like numerals refer to like parts, a goggle constructed in accordance with the invention is indicated in its entirety by the numeral 10. The right and lefthand halves of the goggle 10 are mirror images of each other so that a description of one is applicable also to the other.

The goggle 10 comprises arcuate right and left lens frames 12 and 14 and an interconnecting bridge portion 16. The free end extremities of the lens frames are open, as shown, and temple members 18 and 20, respectively, are hingedly connected to the lens frames adjacent such open ends as indicated at 22 and 24.

The inner faces of the lens frames 12 and 14 are provided with arcuate channels 26 and 28 extending continuously from their open ends throughout their interior lengths for slidably receiving arcuate lenses 30 and 32 in the manner indicated in FIGS. 6 and 7. The arcs of the channels and the lens edges conform so that the inserted lenses are securely seated in the channels.

The lenses 30 and 32 may be rigid and of wrap around cylindrical form. In a preferred embodiment of the goggle the lenses may be cast of CR-39 material. The invention contemplates that sets of lenses 30 and 32 of varying color and density be provided for selective use appropriate to the light glare and other conditions prevailing.

For locking the lenses in the lens frames, the open end walls of the lens frames 12 and 14 and the hinged end walls of the temple members 18 and 20 are flush when the temple members are unfolded in operative head engaging position, as best indicated in FIGS. 3 and 8, and the temple end walls bear against the lens ends securely to hold the lenses in the frames. Alternatively, when the temple members 18 and 20 are returned to folded inoperative position the lens ends are exposed for removal and insertion of other lenses as indicated in FIGS. 6 and 7.

As will be apparent from the foregoing there is provided a rigid lens goggle in which lenses of selected color and density may be inserted, locked in position during use and removed all with the utmost simplicity.

It is to be understood, however, that the present invention is not confined to the particular construction and arrangement of parts herein illustrated and described but embraces all such modifications thereof as may come within the scope of the following claims.

I claim:
1. A goggle of the character described which comprises, open end wall lens frames, removable lenses for said frames, interior channels provided on said frames for receiving the adjacent edges of said lenses inserted in said frames through said open ends, temple members hinged to said frames adjacent said open ends for folding rearwardly of said frames in inoperative position and unfolding outwardly in operative head engaging position, and transverse forward end wells provided on said temple members, the said end walls bearing against the end walls of said frames when said temple members are unfolded outwardly in operative position whereby to lock said lenses in said frames.
2. The device of claim 1 wherein the lens frames and lenses are arcuate.
3. The device of claim 1 wherein the end walls of the temple members are of substantially the same length as the open ends of the lens frames.

References Cited by the Examiner
UNITED STATES PATENTS

| 1,471,562 | 10/1923 | Malcom | 2—14.7 |
| 1,532,480 | 4/1925 | Finch | 2—12 |
| 1,588,775 | 6/1926 | Schumacher | 2—14.7 |
| 2,177,610 | 10/1939 | Ehrlich | 2—12 |
| 2,208,336 | 7/1940 | Marciano | 2—12 |
| 2,364,584 | 12/1944 | Malcom | 2—14.7 |
| 2,391,361 | 12/1945 | Stevenson | 2—14.4 |

JORDAN FRANKLIN, *Primary Examiner.*